United States Patent
Kurup et al.

(10) Patent No.: US 12,269,360 B2
(45) Date of Patent: Apr. 8, 2025

(54) TRANSFORMER CIRCUIT FOR AN ELECTRIC VEHICLE

(71) Applicant: JAGUAR LAND ROVER LIMITED, Coventry (GB)

(72) Inventors: Vishnu Kurup, Warwick (GB); Hui Zhu, Coventry (GB); Manoj Choudhary, Coventry (GB); Chinmaya Joshi, Coventry (GB); Tobias Burgstaller, Coventry (GB); John Stamford, Coventry (GB)

(73) Assignee: Jaguar Land Rover Limited, Coventry (GB)

( * ) Notice: Subject to any disclaimer, the term of this patent is extended or adjusted under 35 U.S.C. 154(b) by 21 days.

(21) Appl. No.: 18/029,554

(22) PCT Filed: Sep. 29, 2021

(86) PCT No.: PCT/EP2021/076748
§ 371 (c)(1),
(2) Date: Mar. 30, 2023

(87) PCT Pub. No.: WO2022/069518
PCT Pub. Date: Apr. 7, 2022

(65) Prior Publication Data
US 2023/0331106 A1    Oct. 19, 2023

(30) Foreign Application Priority Data
Sep. 30, 2020    (GB) ..................... 2015456

(51) Int. Cl.
*B60L 53/22* (2019.01)
*H01F 38/14* (2006.01)

(52) U.S. Cl.
CPC ............. *B60L 53/22* (2019.02); *H01F 38/14* (2013.01); *B60L 2210/10* (2013.01)

(58) Field of Classification Search
CPC ....... B60L 53/22; B60L 2210/10; H01F 38/14
(Continued)

(56) References Cited

U.S. PATENT DOCUMENTS 9,722,433 B2 *   8/2017   Ichikawa ................ B60L 53/12
2019/0143822 A1   5/2019   Malek et al.

FOREIGN PATENT DOCUMENTS

EP    0762446 A1    3/1997
EP    2951050 A2    12/2015
(Continued)

OTHER PUBLICATIONS

International Search Report and Written Opinion for Application No. PCT/EP2021/076748, dated Nov. 23, 2021, 15 pages.
(Continued)

*Primary Examiner* — Hal Kaplan
(74) *Attorney, Agent, or Firm* — Reising Ethington P.C.

(57) ABSTRACT

A transformer circuit (100) for an electric vehicle comprises an input (104); an output (106); and a transformer (108) located between the input and the output. The transformer comprises a primary winding (110) connected to the input; and a secondary winding (102) connected to the output. At least one of the primary winding and the secondary winding comprises a first split winding (112) and a second split winding (114). The first split winding is configured for carrying a higher current than the second split winding. The circuit comprises switching means (116) configured to, where the primary winding comprises the first and second split windings, selectively connect the first split winding to the input, or connect the first and second windings in series to the input, and where the secondary winding comprises the first and second split windings, selectively connect the first split winding (112) to the output (106), or connect the first and second split windings (112, 114) in series to the output.

14 Claims, 8 Drawing Sheets

(58) Field of Classification Search
USPC .................................................. 307/9.1, 10.1
See application file for complete search history.

(56) References Cited

FOREIGN PATENT DOCUMENTS

EP         3503136 A1    6/2019
EP         2951050 B1    12/2019

OTHER PUBLICATIONS

Combined Search and Examination Report for Application No. GB2015456.3, dated Mar. 23, 2021, 7 pages.

* cited by examiner

TRANSFORMER CIRCUIT FOR AN ELECTRIC VEHICLE

TECHNICAL FIELD

The present disclosure relates to circuitry for an electrical vehicle. Aspects relate to a transformer circuit, to a control system, to a system, to a vehicle, to a method, and to computer software.

BACKGROUND

Electric vehicles and hybrid electric vehicles comprise traction motors, and traction batteries for supplying electrical energy to the traction motors. Some traction batteries can be recharged with electrical energy from outside the vehicle, such as electrical energy from an electrical grid. DC-DC and OBC (on-board charger) circuitry in electric vehicles are generally of fixed voltage output. However, in electric car designs, there may be multiple voltage outputs depending on the systems inside the car. Examples include: drive inverters which operate at 400V, advanced driver assistance systems (ADAS) at 12V/48V and a HV battery may charge at 800V. So, for every new system design, if the voltages change from what has been used in a previous design, a new design/type of voltage converter is required per different voltage. This may be achieved by using multiple DC-DC converters inside the vehicle, which undesirably contribute to an increasing complexity, and cost, of the electrical architecture of the vehicle. It is an aim of examples disclosed herein to address one or more of the disadvantages associated with the prior art.

SUMMARY

A possible solution to the above-mentioned problems may be one system that can dynamically adjust its voltage outputs depending on which electrical system it is serving. This may provide a flexible and re-configurable electrical system, which may be initially designed and delivered, but can then be used in different applications and in various configurations of the vehicle. Improving the flexibility of the electrical circuitry to provide different output voltages may be desirable, in particular in the automotive industry, where it is desirable to use common designs for electrical circuitry. This may allow for lower manufacturing and design costs and labour, and still provide a flexibility in electrical configuration for application for different vehicles, i.e. for different customers and markets. Such a system may, for example, supporting both 800V and 400V traction systems. Such a system may, for example, support both LV (low voltage) and HV (high voltage) systems simultaneously.

Aspects disclosed herein provide a transformer circuit, a control system, a system, a vehicle, a method, and computer software, as claimed in the appended claims.

In an aspect there is provided a transformer circuit for an electric vehicle, the circuit comprising: an input for receiving electrical energy; an output for providing electrical energy to an electrical bus; a transformer located between the input and the output, the transformer comprising a primary winding connected to the input; and a secondary winding connected to the output; wherein at least one of the primary winding and the secondary winding comprises a first split winding and a second split winding, and wherein the first split winding is configured for carrying a higher current than the second split winding; and switching means configured to: where the primary winding comprises the first split winding and the second split winding, selectively connect the first split winding to the input, or connect the first split winding and the second split winding in series to the input; and where the secondary winding comprises the first split winding and the second split winding, selectively connect the first split winding to the output, or connect the first split winding and the second split winding in series to the output.

The first split winding may be configured to carry substantially double the current of the second split winding in some examples. In some examples the charging current may remain substantially the same regardless of the voltage (e.g. being 400V or 800V). The first split winding may be formed of first wire, the second split winding may be formed of second wire, and the first wire may be substantially double a thickness of the second wire. Thus, the first split winding may be configured to carry double the current of the second split winding. The first and second split windings may each have substantially the same number of winding turns.

The switching means may comprise a first switch configured to switch the first split winding into the circuit, and a second switch configured to switch the first split winding and the second split winding into the circuit.

The transformer circuit may comprise an input selection switch connected to the switching means, wherein the input selection switch is configured to, where the primary winding comprises the first split winding and the second split winding, selectively connect the first split winding to the input, or connect the first split winding and the second split winding in series to the input. The transformer circuit may comprise an output selection switch connected to the switching means, wherein the output selection switch is configured to, where the secondary winding comprises the first split winding and the second split winding, selectively connect the first split winding to the output, or connect the first split winding and the second split winding in series to the output.

The primary winding may comprise the first split winding and the second split winding; when the first split winding is connected to the input, the transformer circuit may accept a first voltage at the input, and when the first split winding and the second split winding are connected in series to the input, the transformer circuit may accept a second voltage at the input, wherein the second voltage is substantially double the first voltage.

The secondary winding may comprise the first split winding and the second split winding; when the first split winding is connected to the output, the transformer circuit may provide a first voltage at the output, and when the first split winding and the second split winding are connected in series to the output, the transformer circuit may provide a second voltage at the output, wherein the second voltage is substantially double the first voltage.

The transformer circuit may be configured to operate at one or more of: a high voltage at the input; and a high voltage at both the input and the output; wherein the high voltage is between 60 V and 1500 V DC. Between 60 V and 1500 V DC may be considered equivalent to between 30 V and 1000 V AC root mean square (rms).

The primary winding may comprise the first split winding and the second split winding; the input voltage may comprise a nominal voltage in the range 600V to 1000V when the first split winding and the second split winding are connected in series to the input, and the input voltage may comprise a nominal voltage in the range 300V to 500V when the first split winding is connected to the input.

The secondary winding may comprise the first split winding and the second split winding; the output voltage may comprise a nominal voltage in the range 600V to 1000V when the first split winding and the second split winding are connected in series to the output, and the output voltage may comprise a nominal voltage in the range 300V to 500V when the first split winding is connected to the output.

The secondary winding may comprise the first split winding and the second split winding; the output voltage may comprise a nominal first low voltage in the range 30V to 50V when the first split winding and the second split winding are connected in series to the output, and the output voltage may comprise a nominal second low voltage in the range 5V to 28V when the first split winding is connected to the output. The nominal second low voltage may be lower than the nominal first low voltage. That is, the transformer circuit may be configured to provide a low voltage output. A low voltage may be defined as a working voltage of 50 V DC or lower.

The primary winding may comprise the first split winding and the second split winding; wherein the input voltage may comprise a nominal voltage in the range 600V to 1000V when the first split winding and the second split winding are connected in series to the input, and the input voltage may comprise a nominal voltage in the range 300V to 500V when the first split winding is connected to the input; and the secondary winding may comprise a further first split winding and a further second split winding, wherein the output voltage may comprise a nominal first low voltage in the range 30V to 50V when the further first split winding and the further second split winding are connected in series to the output, and the output voltage may comprises a nominal second low voltage in the range 5V to 28V when the further first split winding is connected to the output. The nominal second low voltage is lower than the nominal first low voltage.

The switching means may further comprise a voltage dimmer configured to decrease the voltage at the output.

The transformer circuit may comprise a first circuit as described above, and a further circuit as described above, wherein the output of the first circuit is connected to the output of the further circuit, provided the output voltage provided of the first circuit may be matched to the input voltage which may be provided to the input of the further circuit.

That is, the transformer circuit for an electric vehicle may comprise: a first input for receiving electrical energy; a first transformer comprising: a first primary winding connected to the input; and a first split secondary winding comprising a first secondary winding and a second secondary winding, wherein the first secondary winding is configured for carrying a higher current than the second secondary winding; a first output for providing electrical energy to a second input of a second transformer; first switching means configured to selectively connect the first secondary winding of the first split secondary winding to the output, or connect the first secondary winding and the second secondary winding of the first split secondary winding in series to the first output; the second input connected to the first output; the second transformer comprising: a split primary winding comprising a first primary winding and a second primary winding, and wherein the first primary winding is configured for carrying a higher current than the second primary winding, wherein the first switching means is configured to selectively connect the first primary winding to the second input when the first secondary winding of the first split secondary winding is connected to the first output, or connect the first primary winding and the second primary winding of the split primary winding in series to the second input when the first secondary winding and the second secondary winding of the first split secondary winding is connected in series to the first output; and a second split secondary winding comprising a first secondary winding and a second secondary winding, and wherein the first secondary winding of the second split secondary winding is configured for carrying a higher current than the second secondary winding of the second split secondary winding; a second output for providing electrical energy to an electrical bus; and second switching means configured to selectively connect the first secondary winding of the second split secondary winding to the second output, or connect the first secondary winding and the second secondary winding of the second split secondary winding in series to the second output.

The switching means may comprise a metal-oxide-semiconductor field-effect transistor (MOSFET), or other power device, such as an insulated-gate bipolar transistor (IGBT) or a bipolar junction transistor (BJT).

In a further aspect there is provided a control system for controlling a transformer circuit for an electric vehicle, the control system comprising one or more controllers, and the transformer circuit comprising: an input for receiving electrical energy; an output for providing electrical energy to an electrical bus; a transformer located between the input and the output, the transformer comprising a primary winding connected to the input; and a secondary winding connected to the output; wherein at least one of the primary winding and the secondary winding comprises a first split winding and a second split winding, and wherein the first split winding is configured for carrying a higher current than the second split winding; and switching means configured to: where the primary winding comprises the first split winding and the second split winding, selectively connect the first split winding to the input, or connect the first split winding and the second split winding in series to the input; and where the secondary winding comprises the first split winding and the second split winding, selectively connect the first split winding to the output, or connect the first split winding and the second split winding in series to the output; the control system configured to control the switching means of the circuit to: where the primary winding comprises the first split winding and the second split winding, selectively connect the first split winding to the input, or connect the first split winding and the second split winding in series to the input; and where the secondary winding comprises the first split winding and the second split winding, selectively connect the first split winding to the output, or connect the first split winding and the second split winding in series to the output.

The one or more controllers may collectively comprise at least one electronic processor having an electrical input for receiving information from one or more sensors and/or one or more external controllers; and at least one electronic memory device connected to the at least one electronic processor and having instructions stored therein. The at least one electronic processor may be configured to access the at least one memory device and execute the instructions thereon so as to cause the control system to control the switching means in dependence on the information.

The control system may be configured to control the switching means by, where the primary winding of a transformer comprises the first split winding and the second split winding: controlling a first input switch to switch the first split winding into the circuit, and controlling a second input switch to switch the first split winding and the second split winding into the circuit.

The control system may be configured to control the switching means by, where the secondary winding of the transformer comprises a first split winding and a second split winding: controlling a first output switch to switch the first split winding into the circuit, and controlling a second output switch to switch the first split winding and the second split winding into the circuit.

In a further aspect there is provided a system comprising a control system as described above, and a transformer circuit as described above.

In a further aspect there is provided a vehicle comprising a transformer circuit as described herein, a control system as described herein, or a system as described herein.

In a further aspect there is provided a method of controlling a transformer circuit for an electric vehicle, the transformer circuit comprising: an input for receiving electrical energy; an output for providing electrical energy to an electrical bus; a transformer located between the input and the output, the transformer comprising a primary winding connected to the input; and a secondary winding connected to the output; wherein at least one of the primary winding and the secondary winding comprises a first split winding and a second split winding, and wherein the first split winding is configured for carrying a higher current than the second split winding; and switching means configured to: where the primary winding comprises the first split winding and the second split winding, selectively connect the first split winding to the input, or connect the first split winding and the second split winding in series to the input; and where the secondary winding comprises the first split winding and the second split winding, selectively connect the first split winding to the output, or connect the first split winding and the second split winding in series to the output; the method comprising controlling the switching means of the circuit to: where the primary winding comprises the first split winding and the second split winding, selectively connect the first split winding to the input, or connect the first split winding and the second split winding in series to the input; and where the secondary winding comprises the first split winding and the second split winding, selectively connect the first split winding to the output, or connect the first split winding and the second split winding in series to the output.

In a further aspect there is provided computer software that, when executed, is arranged to perform a method as described above. The computer software may be stored in a micro-controller, firmware, and/or on a computer readable medium. The computer software may be tangibly stored on a computer readable medium.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more examples will now be described, by way of example only, with reference to the accompanying drawings, in which.

DETAILED DESCRIPTION

Examples disclosed herein may provide a flexible voltage output for use in an electrical vehicle. Certain examples may support both 800V and 400V traction systems. Having the capability to generate 400V or 800V at the On-Board Charger (OBC) output allows the vehicle (i.e. the vehicle's electrical systems) to be compatible with both 800V and 400V charging. This may be desirable so the battery of the vehicle may be charged at either a 400V supply or an 800V supply, and provide a 400V voltage to the vehicle circuitry. Allowing three phase input and single phase input depending on the available input also improves the flexibility of the electrical architecture of the vehicle. Allowing for bi-directional operation (i.e. allowing the battery of the vehicle to be charged, and allowing the charged stored in the vehicle battery to be used to power the vehicle) is desirable. It may also desirable to provide electrical circuitry which does not require the use of electromechanical relays, although relays may be used in the examples disclosed herein.

Certain examples may support both LV (low voltage) and HV (high voltage) systems simultaneously. Having the capability to accept substantially 800V (e.g. a voltage between 650V to 850V) or substantially 400V (e.g. a voltage between 270V to 470V) at the same charging terminal allows for a flexible system capable of operating with different voltage requirements.

Examples discussed herein provide electrical topologies suitable for use with OBC and DCDC converters in the automotive industry, which may be advantageous so that existing systems can be altered rather than entirely new and different electrical topologies being required.

Figure 1A:
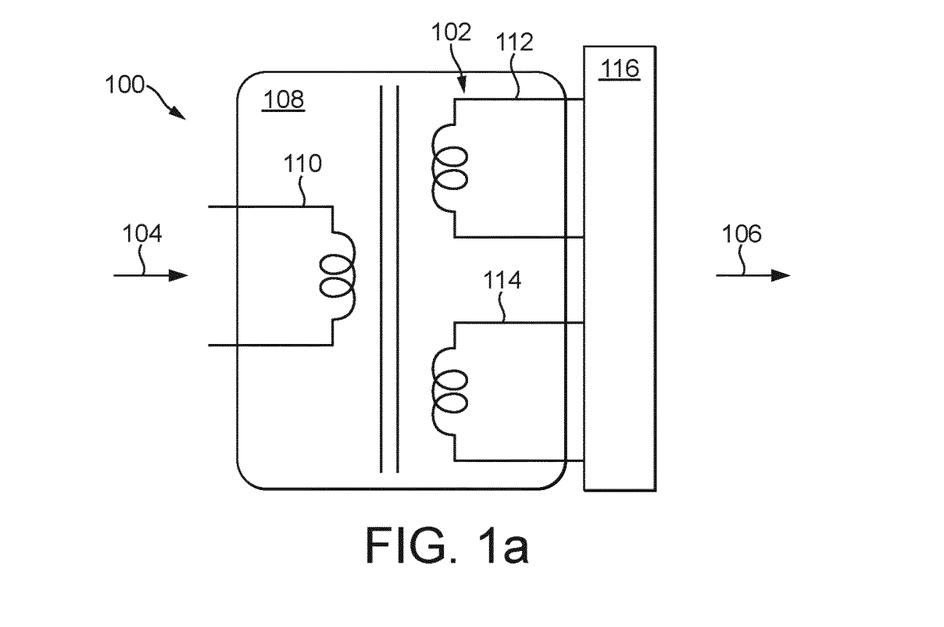
FIG. 1a shows a portion of a transformer circuit having a split secondary winding according to examples disclosed herein.

FIG. 1a shows a portion of a transformer circuit 100 for an electric vehicle, the transformer circuit 100 having a split secondary winding 102. The circuit 100 comprises an input 104 for receiving electrical energy and an output 106 for providing electrical energy to an electrical bus. A transformer 108 is located between the input 104 and the output 106. The transformer 108 comprises a primary winding 110 connected to the input 104, and a secondary winding 102 connected to the output 106. In this example the secondary winding 102 comprises a first split winding 112 and a second split winding 114. The first split winding 112 is configured for carrying a higher current than the second split winding 114.

The circuit 100 also comprises switching means 116 configured to (in this example in which the secondary winding 102 comprises the first split winding 112 and the second split winding 114) selectively connect the first split winding 112 to the output 106, or connect the first split winding 112 and the second split winding 114 in series to the output 106.

In examples in which the secondary winding 102 comprises the first split winding 112 and the second split winding 114, when the first split winding 112 is connected to the output 106, the transformer circuit 100 may provide a first voltage at the output 106, and when the first split winding 112 and the second split winding 114 are connected in series to the output 106, the transformer circuit 100 may provide a second voltage at the output 106. The second voltage may be substantially double the first voltage.

Figure 1B:
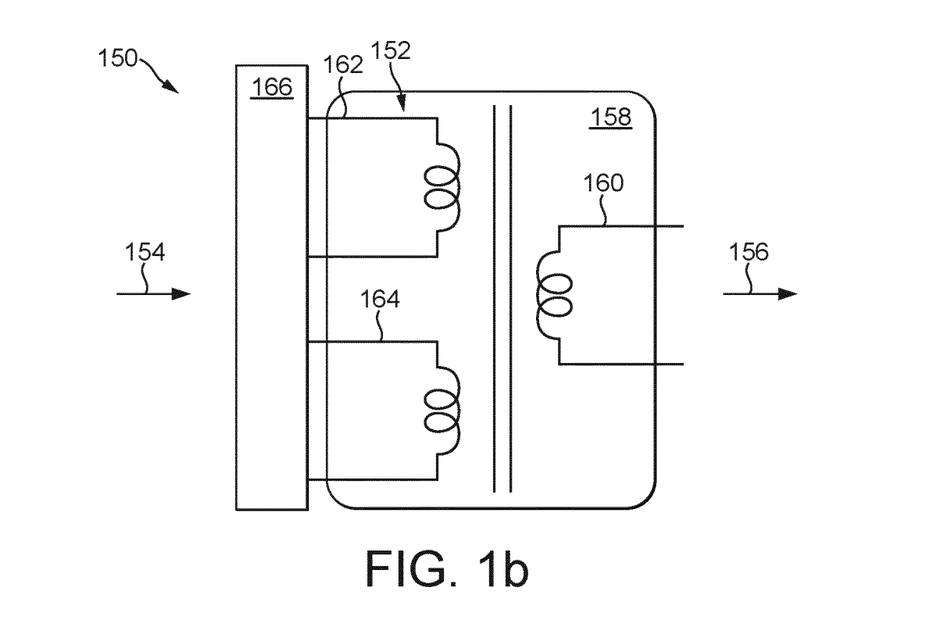
FIG. 1b shows a portion of a transformer circuit having a split primary winding according to examples disclosed herein.

FIG. 1b shows a portion of a transformer circuit 150 for an electric vehicle, the transformer 150 having a split primary winding 152. The circuit 150, as in FIG. 1a, comprises an input 154 for receiving electrical energy and an output 156 for providing electrical energy to an electrical bus. A transformer 158 is located between the input 154 and the output 156. The transformer 158 comprises a primary winding 152 connected to the input 154, and a secondary winding 160 connected to the output 156. In this example the primary winding 152 comprises a first split winding 162 and a second split winding 164. The first split winding 162 is configured for carrying a higher current than the second split winding 164.

The circuit 150 also comprises switching means 166 configured to (in this example in which the primary winding 152 comprises the first split winding 162 and the second split winding 164) selectively connect the first split winding 162 to the input 154, or connect the first split winding 162 and the second split winding 164 in series to the input 156.

In examples in which the primary winding 152 comprises the first split winding 162 and the second split winding 164, when the first split winding 162 is connected to the input 154, the transformer circuit 150 may accept a first voltage at the input 154, and when the first split winding 162 and the second split winding 164 are connected in series to the input 154, the transformer circuit 150 may accept a second voltage at the input 154. The second voltage may be substantially double the first voltage.

In the above examples of FIGS. 1a-1b, the first split winding 112, 162 may be configured to carry substantially double the current of the second split winding 114, 164. The first split winding 112, 162 may be formed of first wire, the second split winding 114, 164 may be formed of second wire, and the first wire 112, 162 may be substantially double a thickness of the second wire 114, 164. Thus, the first split winding 112, 162 may be configured to carry double the current of the second split winding 114, 164. For example, one of the two split windings may be made of wire of SWG 9 (standard wire gauge 9), whereas the other of the two split windings may be made of wire of SWG 18. The first 112, 162 and second 114, 164 split windings may each have substantially the same number of winding turns, e.g. 14 turns, or 22 turns.

The transformer circuit 100, 150 may be configured to operate at a high voltage at the input 104, 154, or at both the input 104, 154 and the output 106,156. A high voltage may be defined as between 60 V and 1500 V DC in some examples. Between 60 V and 1500 V DC may be considered equivalent to between 30 V and 1000 V AC root mean square (rms).

For example, the secondary winding 102 may comprise the first split winding 112 and the second split winding 114 as in FIG. 1a. The output voltage may comprise a nominal voltage in a first higher range, e.g. 600V to 1000V, or e.g. 650V to 850V, when the first split winding 112 and the second split winding 114 are connected in series to the output 106, and the output voltage may comprise a nominal voltage in a second lower range of e.g. 300V to 500V, or e.g. 270V to 470V, when the first split winding 112 is connected to the output 106.

For example, the primary winding 152 may comprise the first split winding 162 and the second split winding 164 as in FIG. 1b. The input voltage may comprise a nominal voltage in the range e.g. 600V to 1000V (or e.g. in the range 650V to 850V) when the first split winding 162 and the second split winding 164 are connected in series to the input 154, and the input voltage may comprise a nominal voltage in the range e.g. 300V to 500V (or e.g. in the range 270V to 470V) when the first split winding 162 is connected to the input 154.

Figure 3:
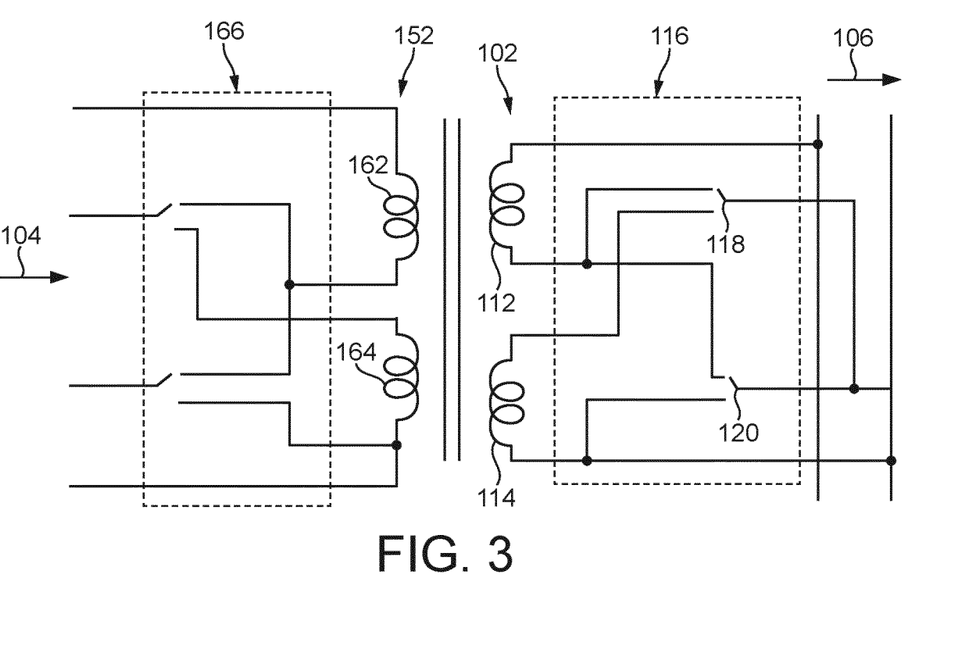
FIG. 3 shows a portion of a transformer circuit having a split primary winding with schematic switching means and a split secondary winding with schematic switching means according to examples disclosed herein.
Figure 4:
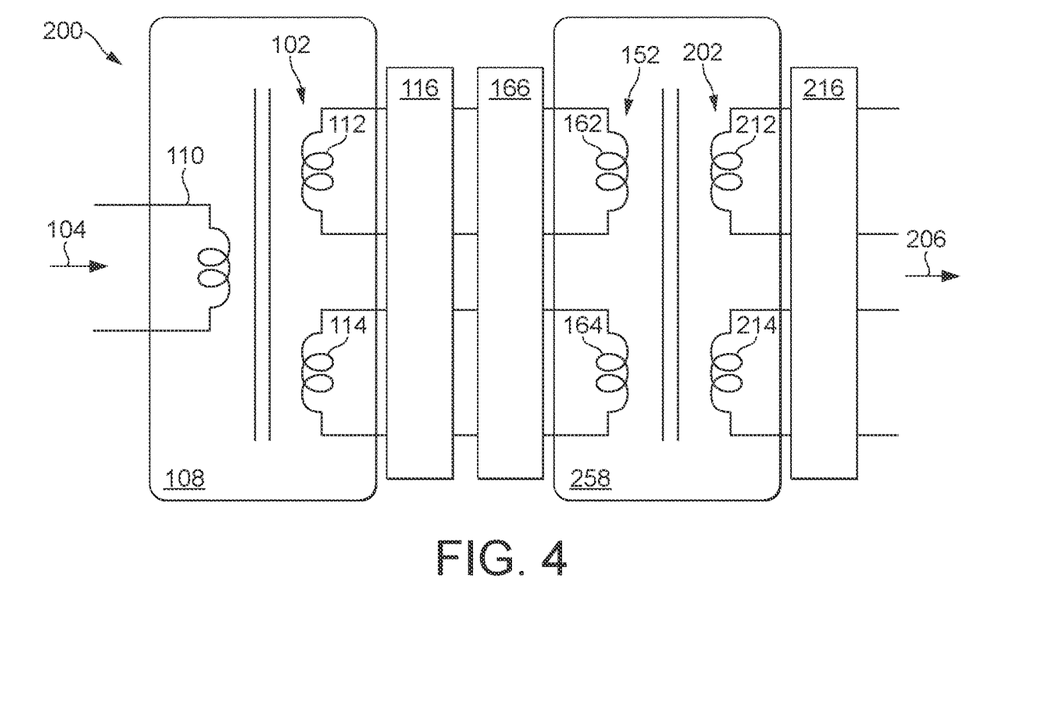
FIG. 4 shows a portion of a transformer circuit having a first transformer with a split secondary winding, coupled to a second transformer having split primary and secondary windings according to examples disclosed herein.
Figure 10:
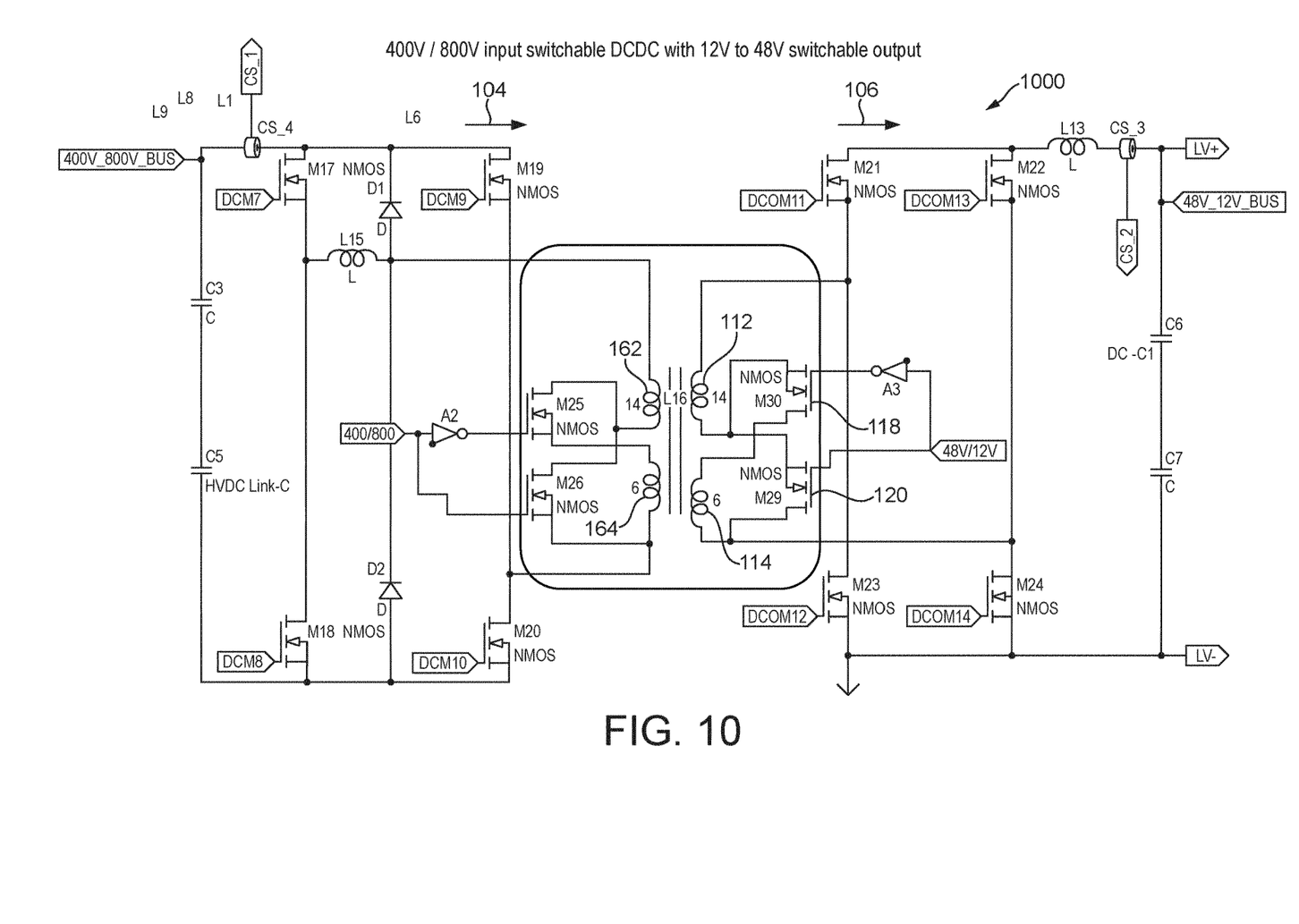
FIG. 10 illustrates a circuit diagram of a transformer circuit having both split primary and secondary windings according to examples disclosed herein.

The transformer circuit 100, 150 may be configured to operate at a low voltage at the output 106,156. For example, as in FIG. 1a, where the secondary winding 102 comprises the first split winding 112 and the second split winding 114, the output voltage may comprise a nominal first low voltage in the range 5V to 28V (e.g. substantially 12V or substantially 24V) when the first split winding 112 is connected to the output 106, and the output voltage may comprise a nominal second low voltage in the range 30V to 50V (e.g. substantially 36V or substantially 48V) when the first split winding 112 and the second split winding 114 are connected in series to the output 106. The nominal second low voltage (range) may be higher than the nominal first low voltage (range). The labels "first" and "second" low voltage do not imply any particular order or hierarchy. In other examples, a low output voltage may be provided by a transformer circuit which also comprises a split primary winding as shown in FIGS. 3 and 10, and/or which may comprise more than one transformer as shown in FIG. 4.

Figure 2:
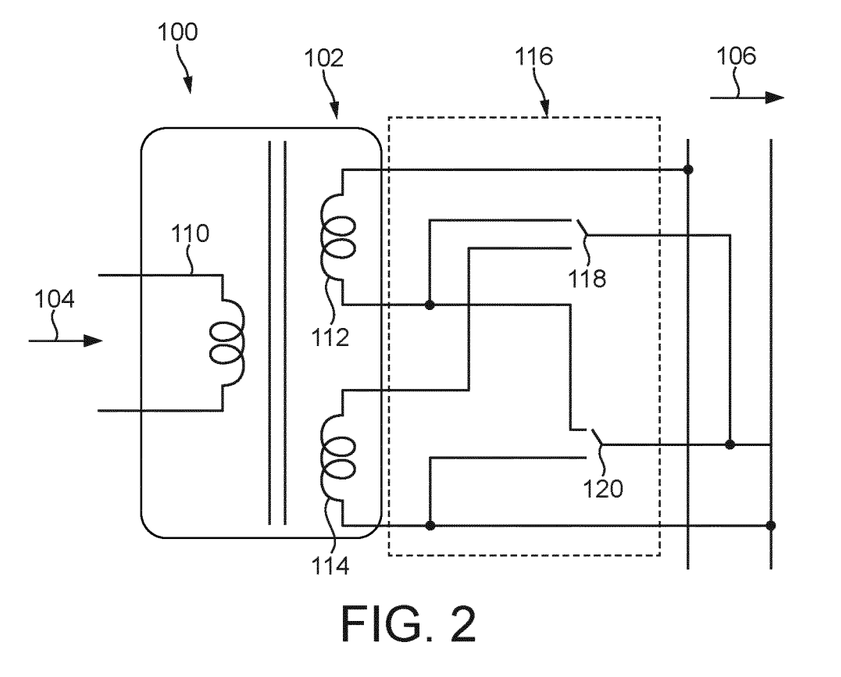
FIG. 2 shows a portion of a transformer circuit having a split secondary winding with schematic switching means according to examples disclosed herein.

FIG. 2 shows a portion of a transformer circuit 100 having a split secondary winding with schematic switching means. As in FIG. 1a, the transformer circuit 100 comprises a transformer 108 located between the input 104 and the output 106, wherein the transformer 108 has a primary winding 110 connected to the input 104 and a split secondary winding 102 connected to the output 106. The split secondary winding 102 comprises a first split winding 112 and a second split winding 114, and the first split winding 112 is configured for carrying a higher current than the second split winding 114.

The switching means 116 in this example comprises a first switch 118 configured to switch the first split winding 112 into the circuit 100, and a second switch 120 configured to switch the first split winding 112 and the second split winding 114 into the circuit in series. The switches 118, 120 are shown as general electronic switches in FIG. 2. In some examples, the switching means (e.g. one or more of the switches 118, 120) may comprise a power device such as a MOSFET (Metal Oxide Semiconductor Field Effect Transistor), IGBT (insulated-gate bipolar transistor) or BJT (Bipolar Junction Transistor).

In other examples, it may be that the primary winding 110 is a split primary winding comprising a first split winding and a second split winding, and the first split winding is configured for carrying a higher current than the second split winding. The switching means in such examples may comprise a first switch configured to switch the first split winding into the circuit 100, and a second switch configured to switch the first split winding and the second split winding into the circuit in series.

In some examples, the transformer circuit may comprise an input selection switch connected to the switching means (e.g. in examples with a split primary winding, to switch in the first and second split primary windings, and/or in in examples with a split secondary winding, to switch in the first and second split secondary windings). The input selection switch is configured to, where the primary winding comprises the first split winding and the second split winding, selectively connect the first split winding to the input, or connect the first split winding and the second split winding in series to the input. The input selection switch is configured to, where the secondary winding comprises the first split winding and the second split winding, selectively connect the first split winding to the output, or connect the first split winding and the second split winding in series to the output.

FIG. 3 shows a portion of a transformer circuit 100 having a split primary winding 152 with schematic primary switching means 166 and a split secondary winding 102 with schematic secondary switching means 116. The primary winding 152 comprises a first split winding 162 and a second split winding 164. The secondary winding 102 comprises a further first split winding 112 and a further second split winding 114.

The input voltage at the input 104 may comprise a nominal voltage in the range 600V to 1000V (e.g. 800V DC) when the first split winding 162 and the second split winding 164 are connected in series to the input 104, and the input voltage may comprise a nominal voltage in the range 300V to 500V (e.g. 400V DC) when the first split winding 162 is connected to the input 104.

In some such examples, the output voltage may be in a low voltage range (e.g. below 48V DC). For example, the output voltage at the output 106 may comprise a nominal first low voltage in the range 30V to 50V (e.g. 36V or 48V) when the further first split winding 112 and the further second split winding 114 are connected in series to the output 106, and the output voltage may comprise a nominal second low voltage in the range 5V to 28V (e.g. 12V or 24V) when the further first split winding 112 is connected to the output. The nominal second low voltage is lower than the nominal first low voltage.

In some examples, such as examples providing a low voltage (e.g. below 48V DC at the output 106), the switching means 116 may further comprise a voltage dimmer, such as a pulse width modulated voltage dimmer, configured to decrease the voltage at the output. For example, such a voltage dimmer may be used to reduce an output voltage from 48V to 36V, or from 24V to 12V.

A low voltage output may be desirable for powering auxiliary electrical loads of a vehicle. For example, an auxiliary load may comprise a heater, a chiller, an air conditioning compressor, a power-assisted steering system, an active roll control pump, a suspension compressor, an in-vehicle device charging point, and a heated windscreen. An auxiliary load may be any other auxiliary device that may be converted from operating at 12V to operating at 400V. This could include a power inverter for providing alternating current (AC) for supplying domestic appliances.

FIG. 4 shows a transformer circuit 200 having a first transformer 108 with a split secondary winding 102, coupled to a second transformer 258 having split primary winding 152 and a split secondary winding 202. The transformer circuit 200 comprises a first circuit as described in relation to FIG. 1*a*, and a further circuit as described in relation to FIG. 3, wherein the output of the first circuit is connected to the input of the further circuit, and the output voltage provided by the first circuit is matched to the input voltage provided to the input of the further circuit. An example is a circuit 200 comprising a first circuit accepting a high voltage (e.g. 400V or 800V) connected to a second circuit providing a low voltage (e.g. under 50V output).

The transformer circuit 200 thus comprises a first input 104 for receiving electrical energy; a first transformer 108 comprising: a first primary winding 110 connected to the input 104; and a first split secondary winding 102 comprising a first secondary winding 112 and a second secondary winding 114, wherein the first secondary winding 112 is configured for carrying a higher current than the second secondary winding 114; a first output for providing electrical energy to a second input of a second transformer 258; first switching means 116, 166 configured to selectively connect the first secondary winding 112 of the first split secondary winding 102 to the output, or connect the first secondary winding 112 and the second secondary winding 114 of the first split secondary winding 102 in series to the first output; the second input of the second transformer 258 connected to the first output of the first transformer 108. The first switching means 116, 166 is illustrated in FIG. 4 as two separate modules for comparison with the earlier described circuits. In some examples the first switching means may be two separate modules as shown, which are electrically connected for mutual combined operation. In some examples, the first switching means may be a single switching module connected between the first and second transformer circuits, for example to aid in providing control signals to control the switching of split windings 112, 114, 162, 164, at the secondary side of the first circuit and the primary side of these second circuit, since the voltage provided by the first circuit should match the voltage provided to the second transformer circuit.

The second transformer 258 comprises a split primary winding 152 comprising a first split primary winding 162 and a second split primary winding 164, wherein the first split primary winding 162 is configured for carrying a higher current than the second split primary winding 164, wherein the first switching means 116, 166 is configured to selectively connect the first split primary winding 162 to the second input when the first secondary winding 112 of the first split secondary winding 152 is connected to the first output, or connect the first split primary winding 162 and the second split primary winding 164 of the split primary winding 152 in series to the second input when the first secondary winding 112 and the second secondary winding 114 of the first split secondary winding 102 is connected in series to the first output. The second transformer 258 further comprises a second split secondary winding 202 comprising a first secondary winding 212 and a second secondary winding 214, and wherein the first secondary winding 212 of the second split secondary winding 202 is configured for carrying a higher current than the second secondary winding 214 of the second split secondary winding 202; a second output 206 for providing electrical energy to an electrical bus; and second switching means 216 configured to selectively connect the first secondary winding 212 of the second split secondary winding 202 to the second output 206, or connect the first secondary winding 212 and the second secondary winding 214 of the second split secondary winding 202 in series to the second output 206. For example, after receiving a high voltage of either 400V or 800V, the second transformer 258 may convert this to a low voltage of e.g. 24V or 48V, dependent on the switching configuration of the second switching means 216.

Figure 5:
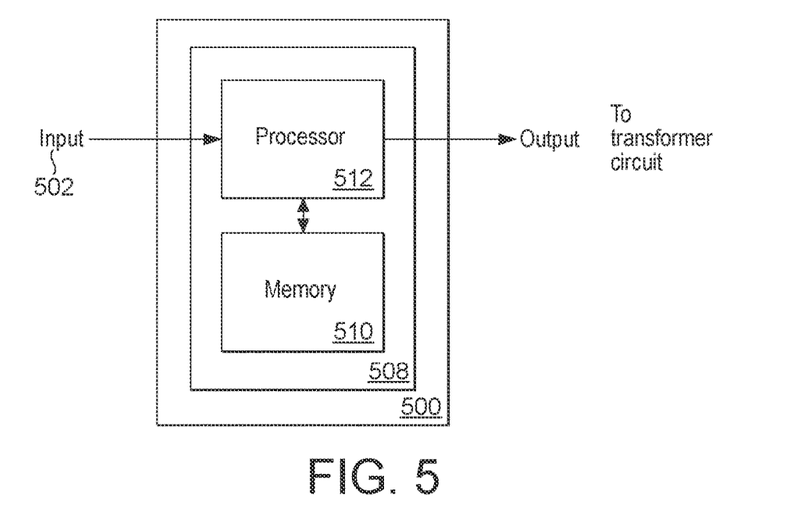
FIG. 5 shows a control system according to examples disclosed herein.

FIG. 5 shows a control system 500 for controlling a transformer circuit for an electric vehicle as described above. The control system 500 comprises one or more controllers 508. The control system 500 is configured to control the switching means of a circuit as described to, where the primary winding comprises the first split winding and the second split winding, selectively connect the first split winding to the input, or connect the first split winding and the second split winding in series to the input; and where the secondary winding comprises the first split winding and the second split winding, selectively connect the first split winding to the output, or connect the first split winding and the second split winding in series to the output.

The one or more controllers 508 may collectively comprise at least one electronic processor 512 having an electrical input 502 for receiving information from one or more sensors and/or one or more external controllers; and at least one electronic memory device 510 connected to the at least one electronic processor 512 and having instructions stored therein. The at least one electronic processor 512 may be configured to access the at least one memory device 510 and execute the instructions thereon so as to cause the control system 500 to control the switching means in dependence on the information.

The control system 500 may be configured to control the switching means 166 by, where the primary winding 152 of a transformer 158 comprises the first split winding 162 and the second split winding 164 as in FIG. 1b: controlling a first input switch to switch the first split winding 162 into the circuit, and controlling a second input switch to switch the first split winding 162 and the second split winding 164 into the circuit. The control system may be configured to control the switching means 116 by, where the secondary winding 102 of the transformer 108 comprises a first split winding 112 and a second split winding 114 as in FIG. 1a: controlling a first output switch to switch the first split winding 112 into the circuit, and controlling a second output switch to switch the first split winding 112 and the second split winding 114 into the circuit in series.

The controller(s) 500 may each comprise a control unit 508 or computational device having one or more electronic processors 512. A vehicle (see FIG. 7) and/or a system thereof (see FIG. 6) may comprise a single control unit 508 or electronic controller 500 or alternatively different functions of the controller(s) 500 may be embodied in, or hosted in, different control units 508 or controllers 500. A set of instructions could be provided which, when executed, cause said controller(s) 500 or control unit(s) 508 to implement the control techniques described herein (including the described method(s)). The set of instructions may be embedded in one or more electronic processors 512, or alternatively, the set of instructions could be provided as software to be executed by one or more electronic processor(s) 512. For example, a first controller 508 may be implemented in software run on one or more electronic processors 512, and one or more other controllers 508 may also be implemented in software run on one or more electronic processors 512, or, optionally, on the same one or more processors 512 as the first controller 508. It will be appreciated, however, that other arrangements are also useful, and therefore, the present disclosure is not intended to be limited to any particular arrangement. In any event, the set of instructions described above may be embedded in a computer-readable storage medium (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical or other types of medium for storing such information/instructions.

Figure 6:
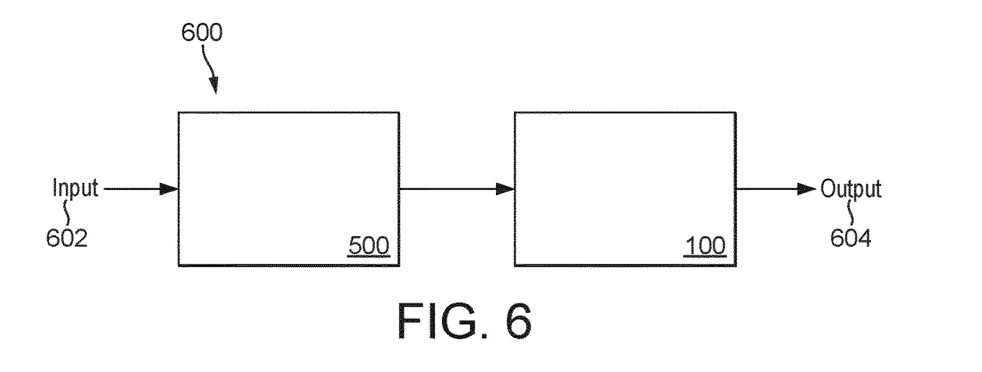
FIG. 6 shows a system according to examples disclosed herein.

FIG. 6 illustrates a system 600 comprising an input 602, a control system 500, for example as illustrated in FIG. 5, a transformer circuit 100 as disclosed herein and controlled by the control system 500, and an output 604. Energy input goes into the transformer circuit 100 and is converted to energy output at output 604. Control input is provided to the controller at input 602, and control output is provided to the transformer circuit 100 from the controller 500. The controller 500 is not in the energy path as the transformer circuit 100 is.

Figure 7:
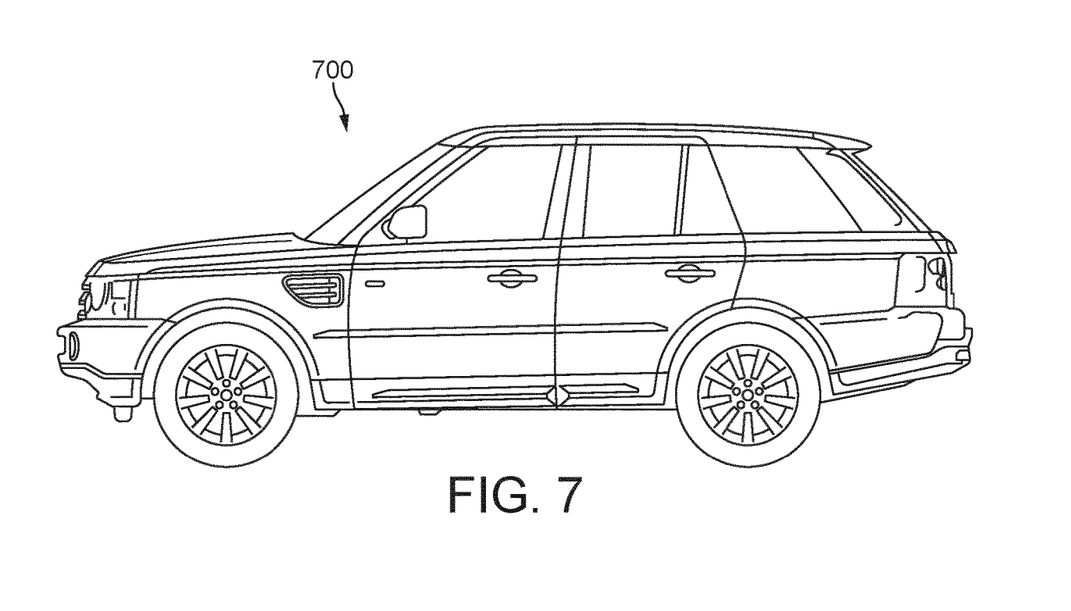
FIG. 7 shows a vehicle according to examples disclosed herein.

FIG. 7 shows a vehicle 700 comprising a transformer circuit 100, 200 as described above, a control system 500 as described above, or a system 600 as described above. The example vehicle 700 may be a passenger vehicle, also referred to as a passenger car or as an automobile, or in other examples, the vehicle 700 may be an industrial vehicle. The vehicle 700 may be an electric vehicle (EV) or a hybrid electric vehicle (HEV). If the vehicle 700 is an HEV, the vehicle 700 may be a plug-in HEV or a mild HEV. If the vehicle 700 is a plug-in HEV, the vehicle 700 may be a series HEV or a parallel HEV. In a parallel HEV, a traction motor and an internal combustion engine are operable in parallel to simultaneously provide tractive torque. In a series HEV, the internal combustion engine generates electricity and the traction motor exclusively provides tractive torque.

Figure 8A:
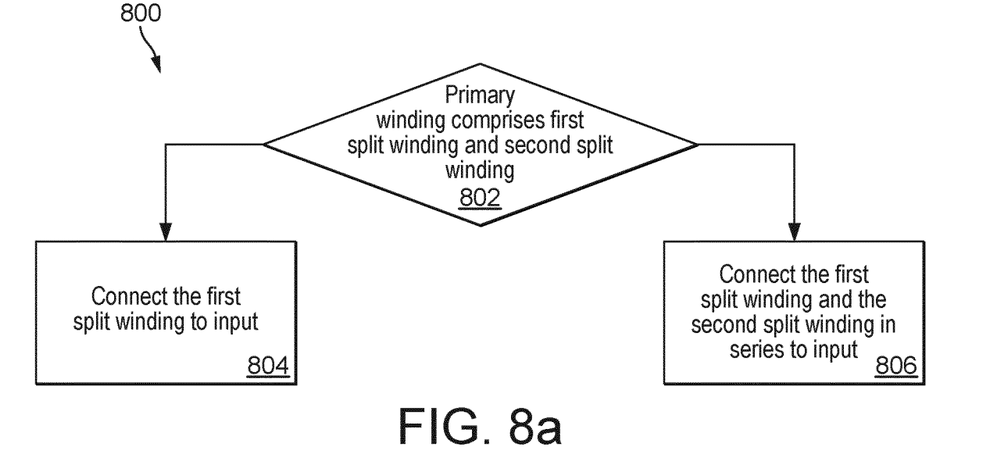
FIGS. 8a-8b show methods of controlling a transformer circuit according to examples disclosed herein.
Figure 8B:
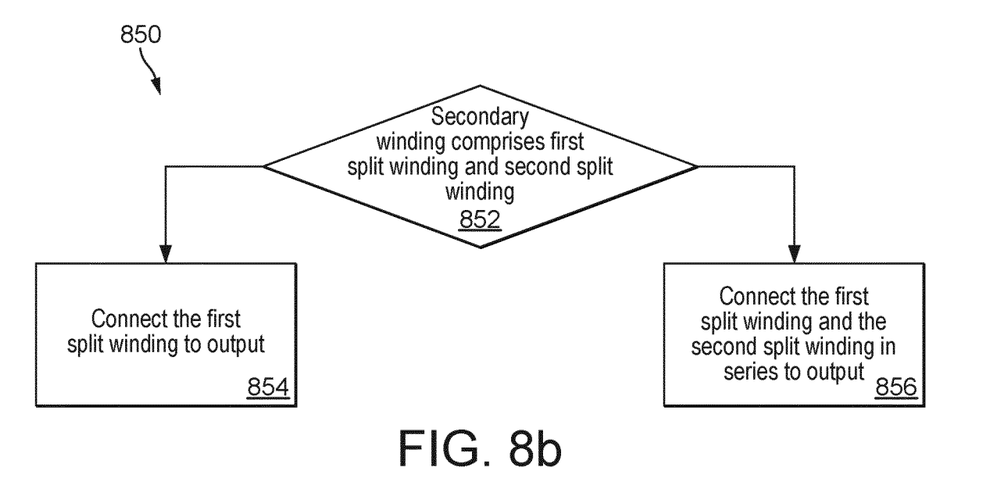

FIGS. 8a-8b show methods of controlling a transformer circuit according to examples disclosed herein. FIG. 8a shows a method 800 of controlling a transformer circuit for an electric vehicle as described above. The method 800 comprises, where the primary winding comprises a first split winding and a second split winding 802, controlling the switching means of the circuit to selectively connect the first split winding to the input 804, or connect the first split winding and the second split winding in series to the input 806.

FIG. 8b shows a method 850 of controlling a transformer circuit for an electric vehicle as described above. The method 850 comprises, where the secondary winding comprises a first split winding and a second split winding 852, controlling the switching means of the circuit to selectively connect the first split winding to the output 854, or connect the first split winding and the second split winding in series to the output 856.

The blocks illustrated in the FIGS. 8a-8b may represent steps in a method and/or sections of code in a software program (e.g. as code stored in a micro-controller, or as a computer program stored on a computer readable medium) configured to control a transformer circuit as described above to perform the method steps. The illustration of a particular order to the blocks does not necessarily imply that there is a required or preferred order for the blocks and the order and arrangement of the block may be varied. Furthermore, it may be possible for some steps to be omitted or added in other examples.

Figure 9:
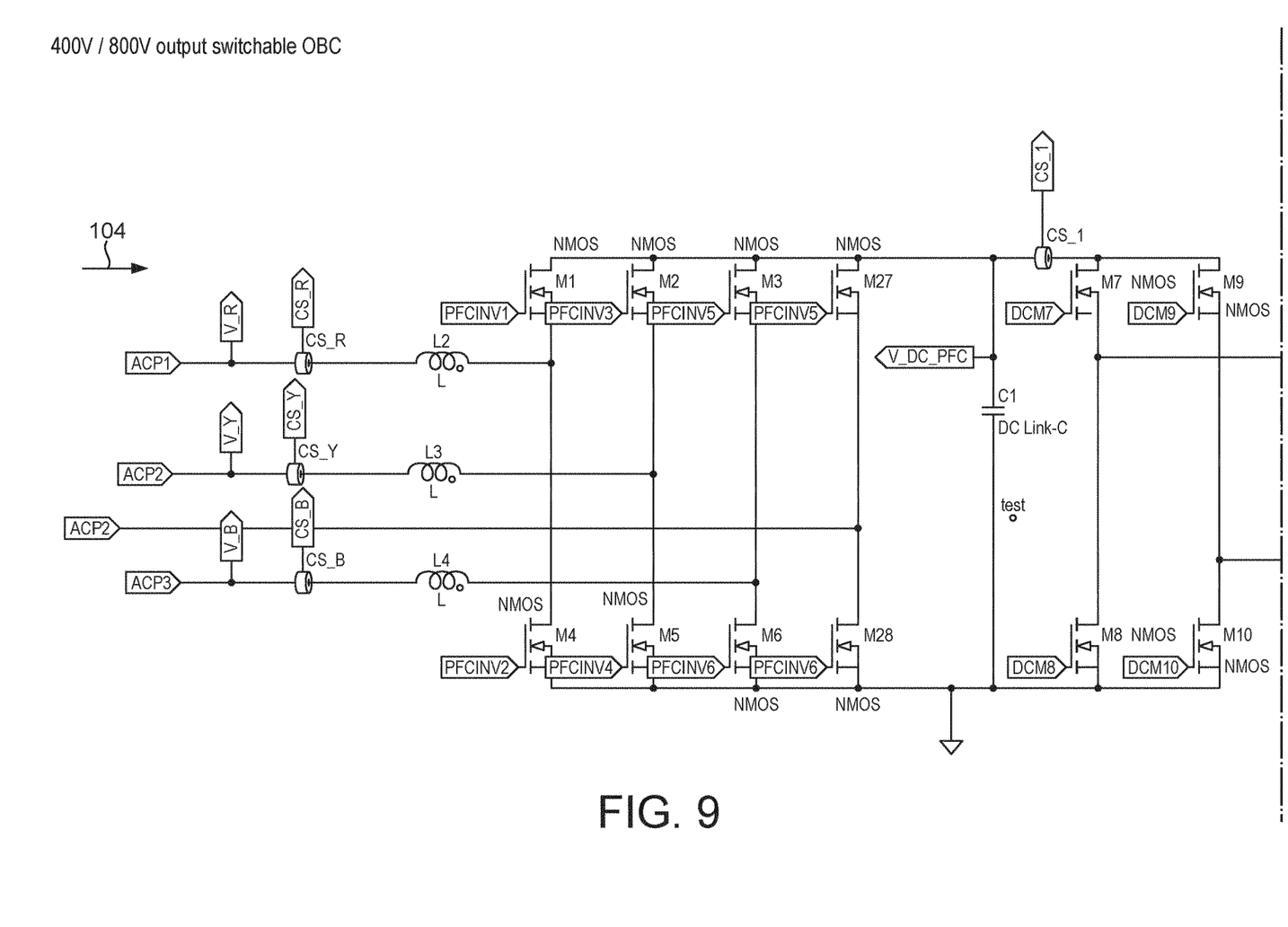
FIG. 9 illustrates a circuit diagram of a transformer circuit having a split secondary winding according to examples disclosed herein.

FIG. 9 illustrates an example circuit diagram of a transformer circuit 900 having a split secondary winding 102 according to examples disclosed herein. As in FIGS. 1a and 2, the circuit 900 comprises an input 104 for receiving electrical energy and an output 106 for providing electrical energy to an electrical bus. The transformer 108 is located between the input 104 and the output 106. The transformer 108 comprises a primary winding 110 connected to the input 104, and a secondary winding 102 connected to the output 106. In this example the secondary winding 102 comprises a first split winding 112 and a second split winding 114. The first split winding 112 is configured for carrying a higher current than the second split winding 114. The circuit 900 also comprises switching means 116 configured to selectively connect the first split winding 112 to the output 106, or connect the first split winding 112 and the second split winding 114 in series to the output 106. One of the split windings 112 can handle twice the current of the other split winding 114. The arrangement of two MOSFET switches in this example allows the two split secondary windings 112, 114 to be connected in the circuit in series, or the first split secondary winding 112 to be connected into the circuit while the second split secondary winding 114 is left floating/unconnected. The MOSFETs shown as M1-M14, M27-M28 may have associated have anti-parallel diodes (not illustrated).

For example, such a circuit may be used as part of an On-Board Charger (OBC) to accept 400V or 800V at the input 104 and provide a voltage at the output. On the output (i.e. OBC output), the transformer 108 can provide either 400V or 800V depending on the switching means switching in particular windings of the first and second split windings 112, 114. In this example the switching means comprises MOSFETs 118, 120 arranged as illustrated, to connect the two split windings 112, 114 at the output of the transformer 108 in series to generate 800V at the output, and connect only one split winding 112 at the output (this winding 112 is designed to handle twice the current as the other winding 114) to obtain 400V at the output. That is, to connect the upper/first split winding into the circuit and leave the lower/second split winding floating/unconnected, then the lower switch 120 may be controlled (i.e. turned on) to connect the upper/first split winding into the circuit and the upper switch 118 may be controlled (i.e. turned off) to leave the lower/second split winding floating. To connect the upper/first split winding and the lower/second split winding in the circuit in series, then the upper switch 118 and lower switch 120 may be controlled (i.e. the upper switch 118 is turned on and the lower switch 120 is turned off) to connect the upper/first and the lower/second split winding in series in the circuit.

Because the first split winding 112 can take twice the current of the second split winding 114, the output power level can remain constant in either arrangement of having the higher-current accepting split winding connected in the circuit, or both the split windings connected in series in the circuit. The output power may remain substantially constant when the transformer is working in a constant power mode. In this constant power mode, the power may be regulated to remain at a certain value. When the voltage is increased, the current is decreased to maintain a constant power. In other modes of operation, the transformer may be used in a constant current mode in which the current is not relative to the voltage.

FIG. 10 illustrates a circuit diagram of an example transformer circuit 1000 having both split primary and split secondary windings. This circuit 1000 is an example of a circuit as shown in FIG. 3, and can accept either 400V or 800V at the input 104, and provide a low voltage in the range of 12V to 48V at the output 106. The primary winding 152 comprises a first split winding 162 and a second split winding 164. The secondary winding 102 comprises a further first split winding 112 and a further second split winding 114. The input voltage at the input 104 comprises a nominal voltage of 800V DC when the first split winding 162 and the second split winding 164 are connected in series to the input 104, and the input voltage comprises a nominal voltage of 400V DC when the first split winding 162 is connected to the input 104.

The output voltage is in a low voltage range in this example (e.g. below 48V DC). For example, the output voltage at the output 106 may comprise a nominal first low voltage in the range 30V to 50V (e.g. 36V or 48V) when the further first split winding 112 and the further second split winding 114 are connected in series to the output 106, and the output voltage may comprise a nominal second low voltage in the range 5V to 28V (e.g. 12V or 24V) when the further first split winding 112 is connected to the output. The nominal second low voltage range is lower than the nominal first low voltage range in this example. In some examples the two output voltage ranges may overlap; in other examples the two output voltage ranges may not overlap.

That is, the split output winding 118, 120 may be designed to be two 24V windings. One of the windings 112 can carry twice the current of the other winding 114. The split output windings are also are connected to a MOSFET switching arrangement 118, 120. By connecting the two split secondary windings 112, 114 in series, a first low voltage (e.g. 48V) is generated, and by connecting only one split winding 112 (which is rated to carry twice the current of the other split winding 114) a voltage of 24V may be generated at the output. If a voltage reducing element such as a voltage dimmer e.g. a pulse width modulated (PWM) voltage dimmer is used, the higher low voltage output may be reduced from e.g. 48V to 36V, and the lower low voltage output may be reduced from e.g. 24V to 12V. An example of a voltage selection logic is shown below:

| OBC DCDC Output Voltage | LV DCDC Input winding selection | LV DCDC Output Winding selection | PWM controlled Voltage dimming | Output Voltage |
|---|---|---|---|---|
| 400 V | 400 | 48 | No | 48 V |
| 400 V | 400 | 48 | Yes | 36 V |
| 400 V | 400 | 24 | No | 24 V |
| 400 V | 400 | 24 | Yes | 12 V |
| 400 V | 800 | 48 | No | 24 V |
| 400 V | 800 | 24 | No | 12 V |
| 800 V | 800 | 48 | No | 48 V |
| 800 V | 800 | 48 | Yes | 36 V |
| 800 V | 800 | 24 | No | 24 V |
| 800 V | 800 | 24 | Yes | 12 V |

The OBC DCDC Output Voltage indicates the voltage provided to the circuit 1000 of FIG. 10, the LV DCDC Input winding selection indicates the voltage accepted at the input to the circuit 1000, LV DCDC Output Winding selection indicates the voltage provided at the output of the circuit 1000 before voltage dimming, PWM controlled Voltage dimming indicates if voltage dimming is applied to the voltage output, and Output Voltage indicated the final output voltage provided by the circuit 1000. The MOSFETs shown as M19-M24 may have associated have anti-parallel diodes (not illustrated).

By connecting the input of the circuit of FIG. 10 to the output of the circuit of FIG. 9, an example similar to that shown in FIG. 4 is obtained. The switching means of the output windings of the first circuit 900 of FIG. 9 should match the switching means of the input of the input windings of the second circuit 1000 of FIG. 10 as indicated in the table above; i.e. if 400V is provided at the output of the first circuit 900, then the switching means of the second circuit 1000 should also be arranged to accept a 400V input voltage. In other words the input windings of the circuit 1000 of FIG. 10 may be designed to be like the output windings of the (e.g. high voltage direct current (HVDC) on-board charger (OBC)) output of the circuit 900 of FIG. 9. The same switching (e.g. MOSFET) arrangement may be used at the primary windings 162, 164 of the circuit 1000 of FIG. 10 as at the output of the circuit 900 of FIG. 9. For example, if the first circuit 900 of FIG. 9 produces either 400V or 800V at the output (i.e. at the input of the circuit 1000 of FIG. 1), then the switching arrangement at the primary windings 162, 164 of the circuit 1000 of FIG. 10 may connect the split primary windings 162, 164 in series when 800V is produced at the OBC output and use only one part of the split primary winding 162 (i.e. the one rated to handle twice the current as the other winding 164) when it is being connected to the 400V OBC output.

Examples disclosed herein allow for port voltages to be configured in multiple ways, which may be desirable for use in multiple vehicles/vehicle configurations. These different voltage requirements for different vehicles may be described as "cross-car requirements". Further, the configuration of the circuits described herein may be adapted by the user 'on the fly'. For example, the vehicle battery may be charged using 800V or 400V chargers without any requirement to update the hardware in the vehicle by use of the switching means allowing acceptable of 400V or 800V at the circuit input. This cannot be done with the existing topology.

It will be appreciated that various changes and modifications can be made to the examples disclosed herein without departing from the scope of the present application as defined by the appended claims.

As used here 'module' refers to a unit or apparatus that excludes certain parts/components that would be added by an end manufacturer or a user.

As used here, 'connected' means 'electrically interconnected' either directly or indirectly. Electrical interconnection does not have to be galvanic. Where the control system is concerned, connected means operably coupled to the extent that messages are transmitted and received via the appropriate communication means.

The term 'current' means electrical current. The term 'voltage' means potential difference. The term 'series' means electrical series. The term 'parallel' means electrical parallel. The term 'power' means electrical power. The term 'charging' means electrical recharging of the battery. The term "winding" is synonymous with "coil" in terms of the transformer windings and split windings. In examples in which one of the split windings is connected in the circuit, for example to accept/provide a lower voltage than if both of two split windings are connected in the circuit in series, it may be understood that the other(s) split winding(s) are not connected in the circuit, i.e. they are left "floating".

Although examples have been described in the preceding paragraphs with reference to various examples, it should be appreciated that modifications to the examples given can be made without departing from the scope of the invention as set out in the appended claims. Features described in the preceding description may be used in combinations other than the combinations explicitly described. Although functions have been described with reference to certain features, those functions may be performable by other features whether described or not. Although features have been described with reference to certain embodiments, those features may also be present in other embodiments whether described or not.

Whilst endeavouring in the foregoing specification to draw attention to those features believed to be of particular importance it should be understood that the Applicant claims protection in respect of any patentable feature or combination of features hereinbefore referred to and/or shown in the drawings whether or not particular emphasis has been placed thereon.

The invention claimed is:

1. A transformer circuit for an electric vehicle, the circuit comprising:
   an input for receiving electrical energy;
   an output for providing electrical energy to an electrical bus;
   a transformer located between the input and the output, the transformer comprising a primary winding connected to the input; and a secondary winding connected to the output; wherein at least one of the primary winding and the secondary winding comprises a first split winding and a second split winding, and wherein the first split winding is configured for carrying a higher current than the second split winding; and
   one or more switches configured to:
      where the primary winding comprises the first split winding and the second split winding, selectively connect the first split winding to the input, or connect the first split winding and the second split winding in series to the input; and
      where the secondary winding comprises the first split winding and the second split winding, selectively connect the first split winding to the output, or connect the first split winding and the second split winding in series to the output.

2. The transformer circuit of claim 1, wherein the one or more switches comprises a first switch configured to switch the first split winding into the circuit, and a second switch configured to switch the first split winding and the second split winding into the circuit.

3. The transformer circuit of claim 1, comprising one or more of:
   an input selection signal connected to the one or more switches, wherein the input selection signal is configured to, where the primary winding comprises the first split winding and the second split winding, selectively connect the first split winding to the input, or connect the first split winding and the second split winding in series to the input; and
   an output selection signal connected to the one or more switches, wherein the output selection signal is configured to, where the secondary winding comprises the first split winding and the second split winding, selectively connect the first split winding to the output, or connect the first split winding and the second split winding in series to the output.

4. The transformer circuit of claim 1, configured to, where the secondary winding comprises the first split winding and the second split winding:
when the first split winding is connected to the output, provide a first voltage at the output, and
when the first split winding and the second split winding are connected in series to the output, provide a second voltage at the output, wherein the second voltage is substantially double the first voltage.

5. The transformer circuit of claim 1, where the primary winding comprises the first split winding and the second split winding, and wherein:
the input voltage comprises a nominal voltage in the range 600V to 1000V when the first split winding and the second split winding are connected in series to the input, and
the input voltage comprises a nominal voltage in the range 300V to 500V when the first split winding is connected to the input.

6. The transformer circuit of claim 1, where the secondary winding comprises the first split winding and the second split winding, and wherein:
the output voltage comprises a nominal voltage in the range 600V to 1000V when the first split winding and the second split winding are connected in series to the output, and
the output voltage comprises a nominal voltage in the range 300V to 500V when the first split winding is connected to the output.

7. The transformer circuit of claim 1, where the secondary winding comprises the first split winding and the second split winding, and wherein:
the output voltage comprises a nominal first low voltage in the range 30V to 50V when the first split winding and the second split winding are connected in series to the output, and
the output voltage comprises a nominal second low voltage in the range 5V to 28V when the first split winding is connected to the output; wherein the nominal second low voltage is lower than the nominal first low voltage.

8. The transformer circuit of claim 1, where the primary winding comprises the first split winding and the second split winding, and wherein:
the input voltage comprises a nominal voltage in the range 600V to 1000V when the first split winding and the second split winding are connected in series to the input, and
the input voltage comprises a nominal voltage in the range 300V to 500V when the
first split winding is connected to the input; and
the secondary winding comprises a further first split winding and a further second split winding, and wherein:
the output voltage comprises a nominal first low voltage in the range 30V to 50V when the further first split winding and the further second split winding are connected in series to the output, and
the output voltage comprises a nominal second low voltage in the range 5V to 28V when the further first split winding is connected to the output; wherein the nominal second low voltage is lower than the nominal first low voltage.

9. The transformer circuit of claim 1, comprising:
a first circuit where a primary winding of the first circuit comprises a first split winding and a second split winding, and wherein:
the input voltage of the first circuit comprises a nominal voltage in the range 600V to 1000V when the first split winding of the first circuit and the second split winding of the first circuit are connected in series to the input, and
the input voltage of the first circuit comprises a nominal voltage in the range 300V to 500V when the first split winding of the first circuit is connected to the input of the first circuit; and
a further circuit where a primary winding of the further circuit comprises a first split winding and a second split winding, and wherein:
the input voltage of the further circuit comprises a nominal voltage in the range 600V to 1000V when the first split winding of the further circuit and the second split winding of the further circuit are connected in series to the input of the further circuit, and
the input voltage of the further circuit comprises a nominal voltage in the range 300V to 500V when the first split winding of the further circuit is connected to the input of the further circuit; and
a secondary winding of the further circuit comprises a further first split winding and a further second split winding, and wherein:
the output voltage of the further circuit comprises a nominal first low voltage in the range 30V to 50V when the further first split winding of the further circuit and the further second split winding of the further circuit are connected in series to the output of the further circuit, and
the output voltage of the further circuit comprises a nominal second low voltage in the range 5V to 28V when the further first split winding of the further circuit is connected to the output of the further circuit; wherein the nominal second low voltage is lower than the nominal first low voltage;
wherein the output of said first circuit is connected to the input of said further circuit.

10. A control system for controlling a transformer circuit for an electric vehicle, the control system comprising one or more controllers, and the transformer circuit comprising:
an input for receiving electrical energy;
an output for providing electrical energy to an electrical bus;
a transformer located between the input and the output, the transformer comprising a primary winding connected to the input; and a secondary winding connected to the output, wherein at least one of the primary winding and the secondary winding comprises a first split winding and a second split winding, and wherein the first split winding is configured for carrying a higher current than the second split winding; and
one or more switches configured to:
where the primary winding comprises the first split winding and the second split winding, selectively connect the first split winding to the input, or connect the first split winding and the second split winding in series to the input; and
where the secondary winding comprises the first split winding and the second split winding, selectively connect the first split winding to the output, or connect the first split winding and the second split winding in series to the output;

the control system configured to control the one or more switches of the circuit to:
    where the primary winding comprises the first split winding and the second split winding, selectively connect the first split winding to the input, or connect the first split winding and the second split winding in series to the input; and
    where the secondary winding comprises the first split winding and the second split winding, selectively connect the first split winding to the output, or connect the first split winding and the second split winding in series to the output.

11. A system comprising the transformer circuit of claim 1.

12. A vehicle comprising the transformer circuit of claim 1.

13. A method of controlling a transformer circuit for an electric vehicle, the transformer circuit comprising:
    an input for receiving electrical energy;
    an output for providing electrical energy to an electrical bus;
    a transformer located between the input and the output, the transformer comprising a primary winding connected to the input; and a secondary winding connected to the output, wherein at least one of the primary winding and the secondary winding comprises a first split winding and a second split winding, and wherein the first split winding is configured for carrying a higher current than the second split winding; and
    one or more switches configured to:
        where the primary winding comprises the first split winding and the second split winding, selectively connect the first split winding to the input, or connect the first split winding and the second split winding in series to the input; and
        where the secondary winding comprises the first split winding and the second split winding, selectively connect the first split winding to the output, or connect the first split winding and the second split winding in series to the output;
    the method comprising: controlling the one or more switches of the circuit to:
        where the primary winding comprises the first split winding and the second split winding, selectively connect the first split winding to the input, or connect the first split winding and the second split winding in series to the input; and
        where the secondary winding comprises the first split winding and the second split winding, selectively connect the first split winding to the output, or connect the first split winding and the second split winding in series to the output.

14. A non-transitory, computer-readable storage medium storing instructions thereon that, when executed by one or more electronic processors, causes the one or more electronic processors to perform the method according to claim 13.

* * * * *